United States Patent [19]
Cottrell, Jr.

[11] Patent Number: 4,672,837
[45] Date of Patent: Jun. 16, 1987

[54] TEST SYSTEM FOR WALK-THROUGH METAL DETECTOR

[76] Inventor: Walker C. Cottrell, Jr., 308 Hillwood Rd., Richmond, Va. 23226

[21] Appl. No.: 892,671
[22] Filed: Aug. 1, 1986
[51] Int. Cl.4 .............................................. G01V 13/00
[52] U.S. Cl. ....................................... 73/1 R; 324/202
[58] Field of Search ........................... 73/1 R; 324/202

[56] References Cited
U.S. PATENT DOCUMENTS
4,110,679 8/1978 Payne .................................... 324/329
4,514,692 4/1985 Johnson et al. ................. 324/233 X Primary Examiner—Tom Noland
Attorney, Agent, or Firm—John F. C. Glenn

[57] ABSTRACT

Sensitivity of a walk-through metal detector is checked by providing a standard metal object simulating the mass, size and metal content of a weapon or other contraband, suspending the object in successive positions simulating where the contraband might be concealed on a person walking through the detector, and swinging the suspended object through each of said positions while operating the detector and observing its response.

6 Claims, 6 Drawing Figures

TEST SYSTEM FOR WALK-THROUGH METAL DETECTOR

BACKGROUND OF THE INVENTION

Walk-through metal detectors are conventionally used for screening passengers at airports, visitors and prisoners at courthouses and prisons, and various visitors and personnel at other high security risk areas, for detecting any gun, knife, contraband or other undesirably concealed metal object on an individual passing through the archway in which the detecting system operates.

In the past it has been considered sufficient to have such detection systems rechecked for accuracy only occasionally and seldom at more than one level of heigth of a typical person going through the archway. However, suppliers have recently started offering weapons which are harder to detect, including pistols made of low magnetic metals such as stainless steel, or consisting principally of non-magnetic components such as plastic or ceramic materials, or made very small. For example, there is now for sale a five shot stainless steel revolver using 22 caliber cartriges, which weighs only four ounces, and can easily be carried through a checkpoint in a hat worn on the head or else in the upper end of a sock worn on the leg. Such developments require frequent and accurate recalibration checks on the capability of metal detectors to pick up hard to detect metal objects, especially as they move at normal walking speed through a conventional checkpoint archway. To minimize expense, the rechecking system must not only be of simple construction but also must be operable by the non-technical personnel who regularly staff the checkpoint.

SUMMARY OF THE INVENTION

In accordance of the present invention, these objectives can be consistently achieved by suspending from the top of the checkpoint archway a metalic test object simulating the mass, composition and general dimensions of the least detector-responsive metal object to be detected, and capable of being swung through the archway in the manner of the bob of a pendulum. The radius of swing is adjustable to place the test object at levels below the archway corresponding to the heights of different parts of an average person passing through the archway, such as at head, waist and ankle levels. Ordinarily it should be sufficient simply to pull back the test object and let it swing through the archway. However, the pull back of the test object before release can be varied at the different heights if it should be required that the speed of the test object should be substantially identical as it passes through the vertical plane of the archway. In either case such testing is preferable to having an operator carry the test object through the archway at the various levels, because personnel are apt to have varying amounts of incidental metal on them which will tend to destandardize the testing, and their speeds are apt to vary, if that should be considered a problem. Furthermore, it would take more time for an operator to carry the test object through the archway than it would to swing back the test object on a suspending line. It is also relatively easy to repeat the pendulum test at different positions across the width of the archway, such as to the left and right as well as in the center.

DRAWING ILLUSTRATING PRESENT PREFERED EMBODIMENT OF THE INVENTION

A present preferred embodiment of the invention is shown in the accompanying drawing, in which there is shown, for purposes of illustration only, the following figures.

DETAILED DESCRIPTION OF PRESENT PREFERRED EMBODIMENT OF THE INVENTION

Figure 1:
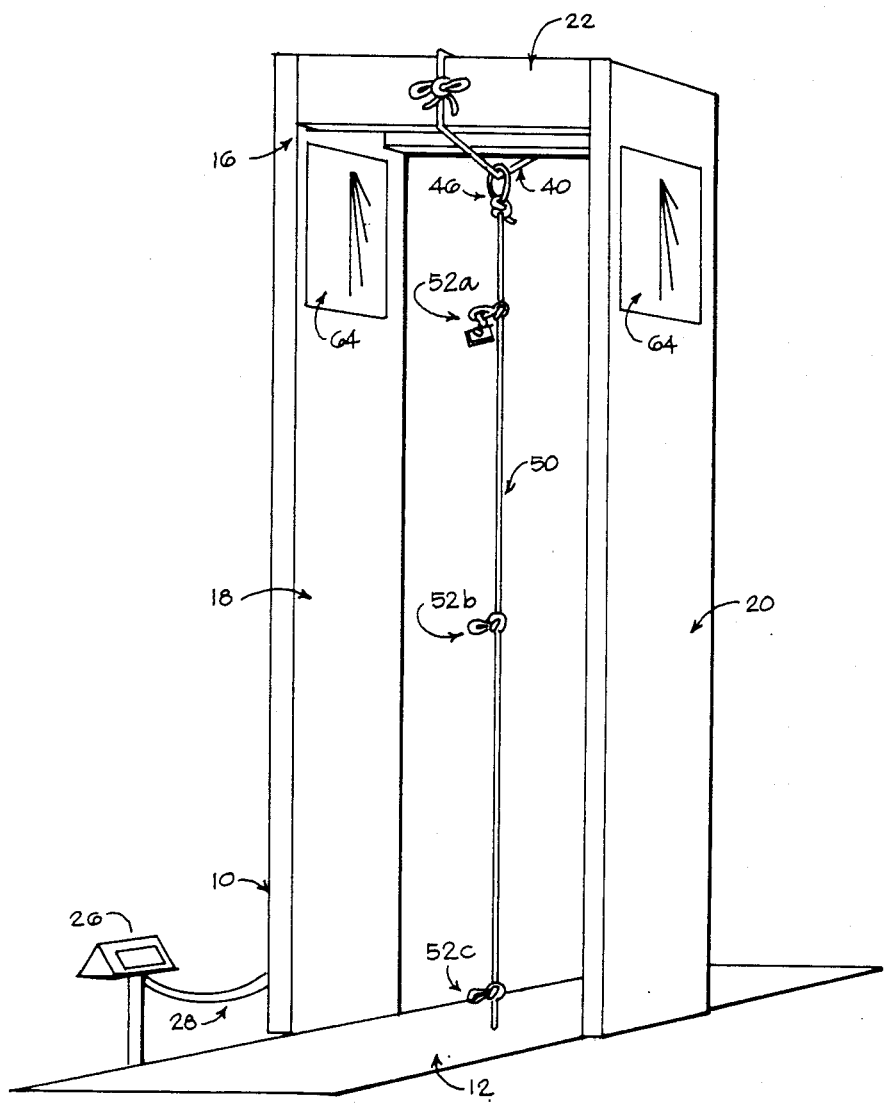
FIG. 1 shows a perspective view of the archway and console of the conventional walk-through metal detector, and a test object suspended in the archway in accordance with the invention.
Figure 2:
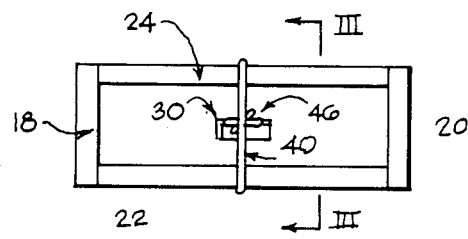
FIG. 2 shows a top plan view of the archway and suspended test object shown in FIG. 1.

Referring now more particularly to the drawings, and initially to FIG. 1, a conventional walk-through metal detector 10 has a walkway 12 extending through an archway 16. The archway has parallel side members 18 and 20 positioned on opposite sides of the walkway 12. The upper ends of the side members are jointed by a pair of parallel horizontal cross members 22 and 24. A console 26 is connected by a cable 28 to conventional electronic circuits (not shown) within archway 16 for detecting the presence of a metal object of significant size on a person walking through the archway. For example, one of the side members may contain circuits for generating a field capable of inducing an electromagnetic response in a metal object between the side members, the other side member may contain circuits for sensing the effects of said response on said field, and the system may operate to signal an alarm when a metal object passing through the walkway electromagnetically responds and thereby causes a significant change in what is sensed by the sensing circuits.

Such a conventional walk-through detector can readily be adjusted to make it more or less sensitive, as desired. The problem is how to calabrate the detector effectively and accurately by the same non-technical personnel who ordinarily operate the detector. This is accomplished by providing a test object 30 which, in terms of induced electromagnetic response, simulates the smallest metal weapon or other metal contriband which the detector is intended to detect.

Figure 4:
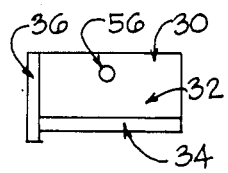
FIG. 4 shows an enlarged side view of the test object.
Figure 5:
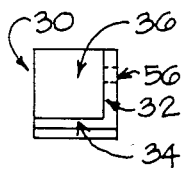
FIG. 5 shows a view from the right end of FIG. 4.
Figure 6:
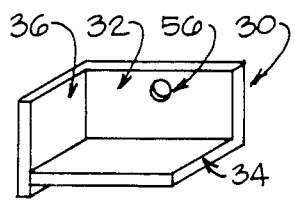
FIG. 6 shows an isometric view of the test object in the scale shown in FIGS. 4 and 5.

The present preferred form of test object has three flat metal plates each normal (at right angle) to the other two plates. For example, as shown in FIGS. 4–6 the object 30 consists of a pair of rectangular plates 32 and 34 joined at right angles along adjacent edges by extrusion or bending and a third rectangular plate 36 secured across the L-shaped ends of the joined plates 32 and 34. The proportions and areas of the plates may be determined by viewing a minimum sized weapon or the like from front, top and side elevations, to determine its proportions and areas of metal exposed to microwaves travelling along the direction of view for each of these elevations.

The electromagnetic response of an object depends not only on its size but also on its composition. Some materials, such as plastic polymers, have almost zero electromagnetic properties, and even metals and their alloys have varying electromagnetic properties. For example, the electromagnetic properties of common carbon steels are strong, while those of stainless steels with high nickel contents are substantially lower. Therefore, the alloy selected for object 30 should be one corresponding to the hardest to detect of the detectable dangerous devices sought to be detected.

The next aspect of the invention is the introduction of object 30 into the field of the detector. This can be accomplished by mounting the object at the end of a polymeric or other non-electromagnetic stick long enough to permit an operator to hold the other end of the stick while standing outside the archway and moving the test object through the archway at various levels, such as at the average head, shoulder and ankle height of individuals passing through the archway, and at the estimated average speed of such individuals as they walk through the archway. Testing in this way is useful in some cases but hard to standardize since individual operators are likely to vary widely in their interpretation and performance of such tests.

Figure 3:
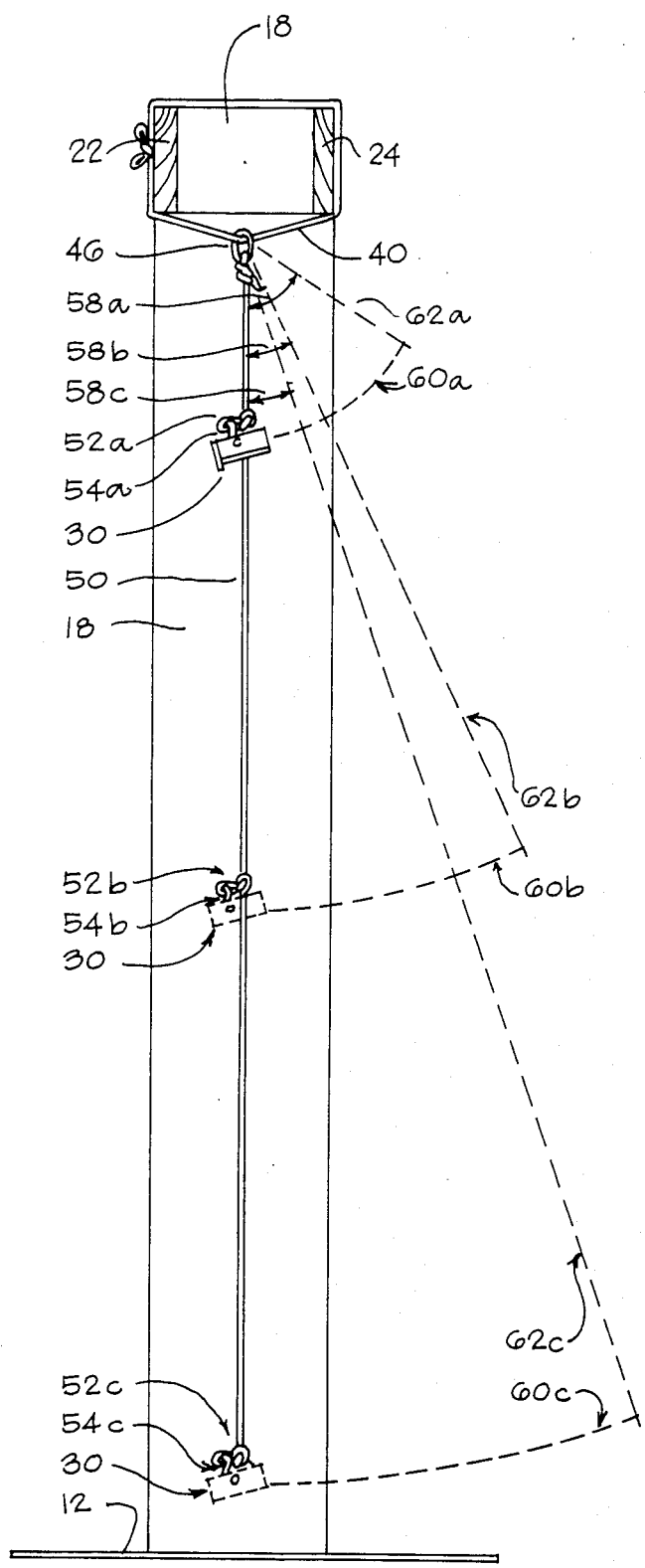
FIG. 3 shows an enlarged view, partially broken away, of a section taken on the lines III—III and in FIG. 2, with phantom lines showing the test object in alternate positions and showing the swing-back positions of the test object at different levels.

For improved uniformity of performance of tests using test object 30 it is preferable to tie a supporting loop 40 around the top of the arachway 16 (around cross members 22 and 24 as shown in FIG. 3) and through a support ring 46 suspended closely beneath the top of the archway. Loop 40 with ring 46 can be positioned midway between side walls 18 and 20, or moved away from center in either direction, as desired. The upper end of a support line 50 is tied to ring 46, for swinging movement with ring 46 about the connection of ring 46 with loop 40. For testing at desired levels, such as at head, shoulder and ankle heights, the line 50 has loops 52a, -b and -c tied along its length at positions from which test object 30 may be suspended at said levels by S-hooks 54a, -b, and -c adapted to be hooked succesively through an opening 56 through plate 32 of test object 30. To minimize confusion with the electromagnetic response of test object 30, line 50 is preferaby in the form of polymeric monofilament, and S-hooks 54 are preferably made of aluminum or polymer.

In order to achieve a standard speed of movement of test object 30 through the vertical plane through support loop 40, the test object in each of its positions along suporting line 50 is drawn away from and in a direction at right angles to said plane and then released. It will then swing in the manner of the bob of a pendulum, reaching its maximum speed as it passes through vertical plane. Referring to FIG. 3, test object 30 while succesively supported on loops 52a, -b and -c is drawn back along the respective arcs 60a, -b and -c of respective angles 58a, -b and -c subtended between line 50 in its vertical position and the respective drawn back portions 62a, -b and -c of line 50 which are between loop 40 and object 30 while it is suspended by the respective loops 52a, -b and -c.

If it should be required to equalize the maximum speed of test object 30 after release at different swing radii, the draw back angle must be increased as the swing radius is decreased. The mathematical formula for calculating this maximum speed is $V = 2gL(1 - \cos A)$, where V is said maximum speed, g is the force of gravity in feet/second$^2$, L is the distance illustrated at 62a, -b and -c, and A is the angle illustrated at 58a, -b and -c. It will be observed that mass is not a variable affecting swing speed (so that the weight of test object 30 can be selected solely in terms of its electromagnetic affect on detector 10), and that angle A is the only variable once the value of L has been determined. On the basis of the formula, it follows that the formula for determining the angle of draw back for achieving a given maximum speed of test object 30 at each of its positions on line 50 is $A = \cos^{-1}(1 - V^2/2gL)$. If, for example, the desired speed is 3 miles per hour, the draw back angles 58a, -b and -c are respectively about 57°, 26° and 19° for lengths 62a, -b and -c of 8, 36 and 69 inches. The values of other speeds, angles and lengths of swing radius may readily be calculated from the same formula, once any two of the thee values are known. The measure of such angles may readily be determined by ordinary personnel by simple observation of the corresponding angular draw-back positions shown on one or more charts 64 posted where they can most conveniently be observed, on the inside or outside or both of one or both of the sidewalls 18 and 20. Each chart may show not only the calculated corrected draw back angles for position of the test object 30 on loops 52a, -b, and -c, but also a protractor scale which includes the whole range of potential draw-back angles for all potential swing radii. The center of swing shown on each chart is preferably positioned where a hypothetical straight horizontal line extending through the connection of ring 46 with loop 40 would intersect the chart.

While present preferred embodiments and practices of the invention have been illustrated and described, the invention is not limited thereto, and may be variously embodied and practiced within the scope of the following claims.

I claim:

1. A calibrator for a walk-through metal detector comprising a metal object simulating the least detectable metal thing sought to be detected, a flexible line, means at one end of the line for suspending it in an archway of a walk-through metal detector, and means for attaching said object at spaced positions along said line whereby the object while suspended at each of its positions along the line may be drawn back and released to swing back at different levels through the archway.

2. A calibrator according to claim 1, wherein said object comprises metal plates lying in different planes, each of said planes being at right angles to the others.

3. A calibrator according to claim 1, wherein said attaching means are spaced to position the metal object at levels approximating ankle, waist and head levels of a person standing in the archway.

4. A method of calibrating a metal detector having a walk-through arch comprising the steps of suspending a line from said arch, attaching a metal test object to the line at a desired level in the arch, drawing the test object away from its suspended position, releasing it, and monitoring the response of the metal detector as the test object swings through its vertically suspended position.

5. A method according to claim 4 including the step of selecting a metal object which is of substantially the same alloy as that of a known type of object to be detected by the detector while in service.

6. A method in accordance with claim 5, including the step of selecting a metal object which is of substantially the same top, side and end profiles as the metal part of the type of metal object to be detected by the detector while in service.

* * * * *